(12) United States Patent
Umeda (10) Patent No.: US 8,873,839 B2
(45) Date of Patent: Oct. 28, 2014

(54) APPARATUS OF LEARNING RECOGNITION DICTIONARY, AND METHOD OF LEARNING RECOGNITION DICTIONARY

(75) Inventor: Ichiro Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 12/899,713

(22) Filed: Oct. 7, 2010

(65) Prior Publication Data

US 2011/0091097 A1    Apr. 21, 2011

(30) Foreign Application Priority Data

Oct. 16, 2009  (JP) .................................. 2009-239553

(51) Int. Cl.
*G06K 9/62* (2006.01)
(52) U.S. Cl.
CPC .................................. *G06K 9/6255* (2013.01)
USPC .......................................................... 382/159
(58) Field of Classification Search
None
See application file for complete search history.

(56) References Cited

U.S. PATENT DOCUMENTS

| | | | | |
|---|---|---|---|---|
| 2004/0223126 | A1* | 11/2004 | Hatakeyama et al. | 353/122 |
| 2007/0064267 | A1* | 3/2007 | Murakata et al. | 358/1.15 |
| 2008/0013865 | A1* | 1/2008 | Park | 382/311 |
| 2008/0199072 | A1* | 8/2008 | Kondo et al. | 382/155 |
| 2008/0247660 | A1* | 10/2008 | Zhang et al. | 382/254 |
| 2009/0027515 | A1* | 1/2009 | Maruyama et al. | 348/223.1 |
| 2010/0265354 | A1* | 10/2010 | Kameyama | 348/222.1 |

FOREIGN PATENT DOCUMENTS

| | | |
|---|---|---|
| JP | 5-46764 A | 2/1993 |
| JP | 7-21367 A | 1/1995 |
| JP | 2008-287378 A | 11/2008 |

OTHER PUBLICATIONS

Viola et al., "Rapid Object Detection using a Booster Cascade of Simple Features", Accepted Conference on Computer Vision and Pattern Recognition, Apr. 15, 2001, pp. 1-9.
Decision of Refusal dated Nov. 5, 2013, in Japanese Application No. 2009-239553.
Office Action dated Jul. 9, 2013, in Japanese Application No. 2009-239553.
Ishida et al., "A Generative Learning Method for the Recognition of Blurred Characters Taken by Portable Camera", Institute of Electronics, Information and Communication Engineers, Sep. 1, 2006, vol. J89-D, No. 9, pp. 2055-2064.

* cited by examiner

*Primary Examiner* — Stephen R Koziol
*Assistant Examiner* — Delomia Gilliard
(74) *Attorney, Agent, or Firm* — Fitzpatrick, Cella, Harper & Scinto (57) ABSTRACT

There are provided a characteristic obtaining unit configured to obtain a subject characteristic including a characteristic of a subject, an image processing unit configured to generate a duplicate subject image by performing an image process to an image of the subject according to the subject characteristic obtained by the characteristic obtaining unit, and a learning unit configured to learn a matching dictionary by using the duplicate subject image generated by the image processing unit. Thus, it is possible to reduce the number of subject images necessary for the learning.

9 Claims, 10 Drawing Sheets

| DETAILS | | IMAGE PROCESSING METHODS | PARAMETERS | INITIAL VALUES |
|---|---|---|---|---|
| ROTATIONAL SYMMETRY | WHETHER SUBJECT CAN BE CONSIDERED TO BE ROTATIONAL SYMMETRICAL | ROTATION | ROTATIONAL ANGLE | 0 DEGREES |
| MIRROR IMAGE SYMMETRY | WHETHER SUBJECT CAN BE CONSIDERED TO BE MIRROR IMAGE SYMMETRICAL | MIRROR IMAGE REVERSAL | WHETHER TO REVERSE IMAGE | NOT TO REVERSE IMAGE |
| PLANARITY | WHETHER SUBJECT CAN BE CONSIDERED TO EXIST ON SINGLE PLANE | PERSPECTIVE CONVERSION | INCLINATION AMOUNT OF PROJECTION SURFACE IN NORMAL LINE DIRECTION | 0 DEGREES |
| BLUR RESISTANCE | WHETHER BLUR RESISTANCE IS NECESSARY | BLUR SYNTHESIZING | BLUR AMOUNT | 0 PIXELS |
| DETECTION SPEED | WHETHER TO DETECT SUBJECT AT HIGH SPEED | REDUCTION AND MARGIN ADDITION | REDUCTION RATIO | PREVIOUSLY PROVIDED VALUE |

APPARATUS OF LEARNING RECOGNITION DICTIONARY, AND METHOD OF LEARNING RECOGNITION DICTIONARY

BACKGROUND OF THE INVENTION

1. Field of the Invention

The present invention relates to an apparatus which learns a recognition dictionary, and a method which learns the recognition dictionary.

2. Description of the Related Art

Conventionally, as a method of detecting an object from an image, there is known a method which is disclosed in Viola and Jones "Rapid Object Detection using Boosted Cascade of Simple Features", Computer Vision and Pattern Recognition, 2001 (hereinafter, called a non-patent document). Further, in such a case of learning a matching dictionary, there is known a method which is disclosed in Japanese Patent Application Laid-Open No. 2008-287378.

It is required to reduce the number of subject images necessary in case of learning the matching dictionary, or to improve performance on the condition of the same number of subject images. Japanese Patent Application Laid-Open No. 2008-287378 discloses a technique of generating a duplicate subject image from a certain subject image by performing mirror reversal and micro-rotation to the subject image. However, in this technique, a duplicate subject image is not generated for an image which is not mirror image symmetrical, whereby it is impossible to reduce the necessary number of the subject images.

SUMMARY OF THE INVENTION

The present invention has been completed in consideration of such a problem as described above, and aims to reduce the number of subject images which are necessary in learning.

Therefore, the present invention is characterized by comprising a characteristic obtaining unit configured to obtain a subject characteristic including a characteristic of a subject, an image processing unit configured to generate a duplicate subject image by performing an image process to an image of the subject according to the subject characteristic obtained by the characteristic obtaining unit, and a learning unit configured to learn a matching dictionary by using the duplicate subject image generated by the image processing unit.

Further features and aspects of the present invention will become apparent from the following detailed description of exemplary embodiments with reference to the attached drawings.

DESCRIPTION OF THE EMBODIMENTS

Hereinafter, exemplary embodiments of the present invention will be described with reference to the attached drawings.

Figure 1:
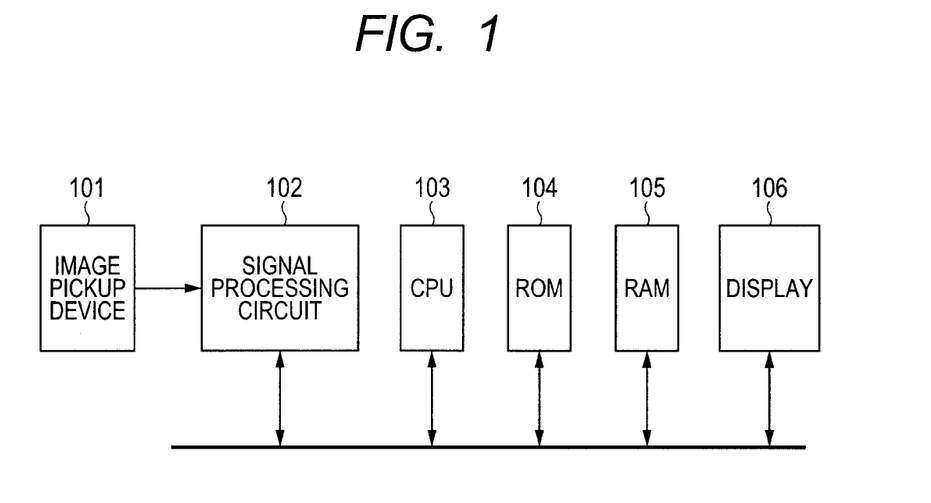
FIG. 1 is a block diagram illustrating an example of a hardware constitution of an image processing apparatus.

FIG. 1 is a block diagram illustrating an example of a hardware constitution of an image processing apparatus.

In FIG. 1, an image pickup device 101, which is constituted by a CCD (charge coupled device), an MOS (metal oxide semiconductor) or the like, converts light from a subject image into an electrical signal.

A signal processing circuit 102 processes a time series signal concerning the subject image obtained from the image pickup device 101, and converts the processed signal into a digital signal.

A CPU (central processing unit) 103 totally controls the image processing apparatus by performing control programs stored in a ROM (read only memory) 104.

The ROM 104 stores the control programs to be performed by the CPU 103, and various parameter data. If the CPU 103 performs the control programs, then later-described various functions of the image processing apparatus and various processes in later-described flow charts are achieved.

A RAM (random access memory) 105 stores image data respectively representing images and various kinds of information. Further, the RAM 105 functions as a working area of the CPU 103 and a temporary data saving area.

A display 106 is constituted by, for example, an LCD (liquid crystal display), a CRT (cathode ray tube) or the like. In the present embodiment, the processes corresponding to respective steps of the later-described flow charts are achieved based on software by using the CPU 103. However, a part or all of the processes may be achieved based on hardware such as an electronic circuit or the like. Further, the image processing apparatus may be achieved by a multipurpose PC (personal computer) without using the image pickup device 101 and the signal processing circuit 102, or may be achieved as an apparatus which is dedicated for image processes. Furthermore, software (programs) obtained through a network or various storage media may be performed by a processing apparatus (a CPU, a processor) such as a personal computer or the like.

Figure 2:
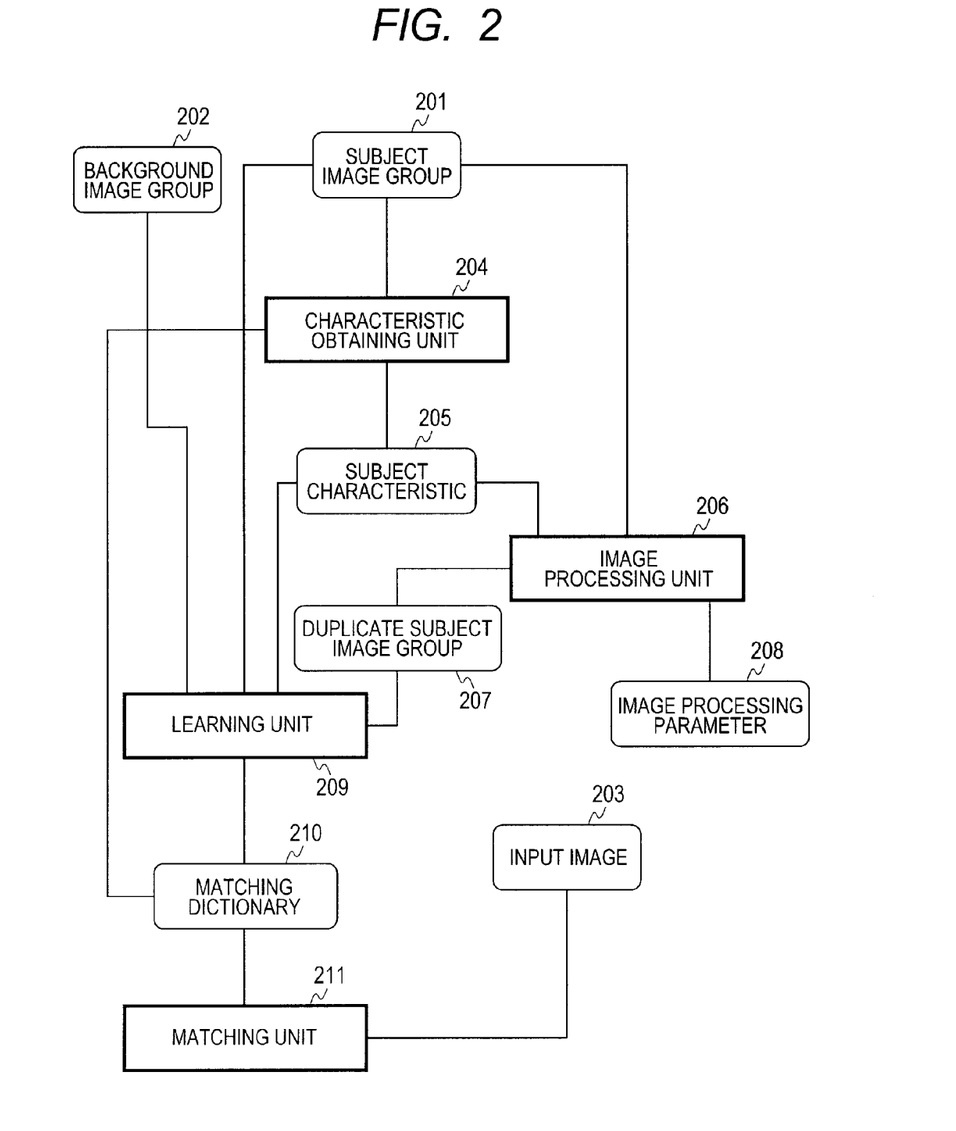
FIG. 2 is a block diagram illustrating an example of a functional constitution of the image processing apparatus.

FIG. 2 is a block diagram illustrating an example of a functional constitution or the like of the image processing apparatus.

In the present embodiment, it is assumed that a subject image group 201, a background image group 202 and an input image 203 are respectively treated as inputs.

Figure 3:
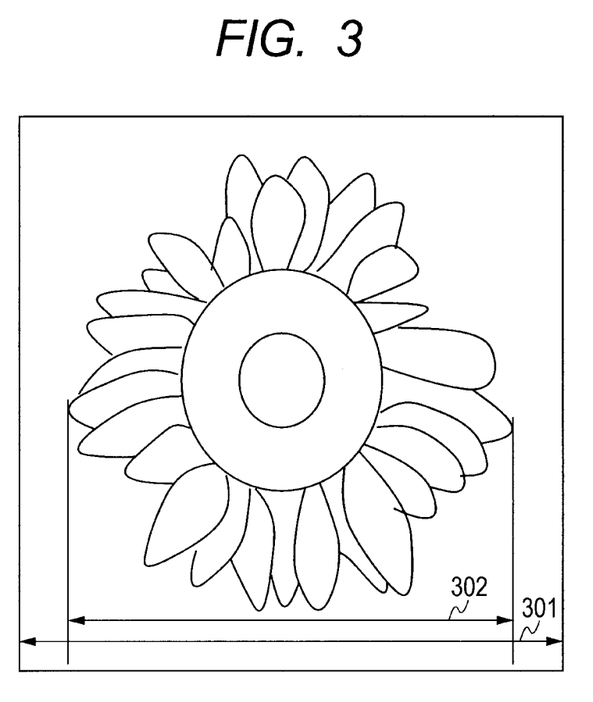
FIG. 3 is a diagram illustrating an example of a subject image.

Here, the subject image group 201 is the aggregate of subject images that a matching dictionary 210 has to learn as positive examples. FIG. 3 is a diagram illustrating an example of the subject image. Namely, although FIG. 3 shows a sunflower as the example, a type of subject is not of course limited to this. Conventionally, the number of the necessary subject images for the learning of the matching dictionary 210 depends on a diversity of the relevant subject. Namely, to cover a large diversity, a large number of the subject images are necessary. Here, an object of the present embodiment is to reduce the number of the subject images in such a case. Thus, the image processing apparatus in the present embodiment generates numerous duplicate subject images from the subject image by image processes according to subject characteristics being the characteristics of the subject image.

Figure 4:
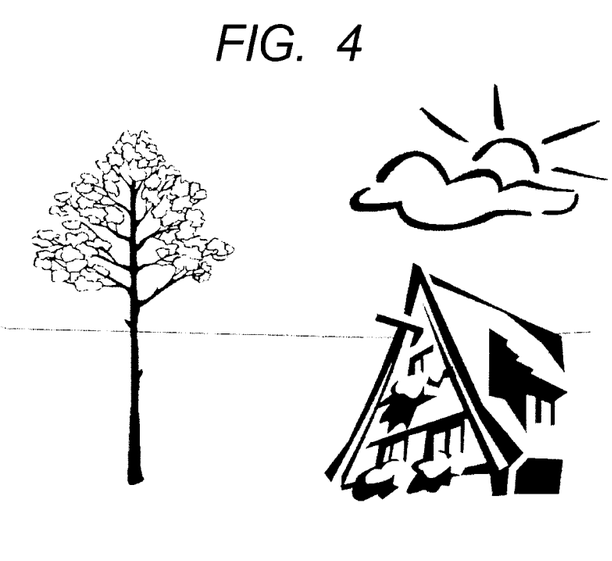
FIG. 4 is a diagram illustrating an example of a background image group.

The background image group 202 is the aggregate of images that the matching dictionary 210 has to learn as negative examples. FIG. 4 is a diagram illustrating an example of the background image group 202. The background image group should be the images which cover an area of the input image 203 not including the subject to the extent possible. However, the background image group may be the aggregate of partial images which are arbitrarily cut off from images, as illustrated in FIG. 4.

The input image 203 is an arbitrary image. A matching unit 211 applies the matching dictionary 210 to the input image. Incidentally, the input image 203 may be an image obtained by the image pickup device 101, as exemplarily illustrated in FIG. 5.

Figure 5:
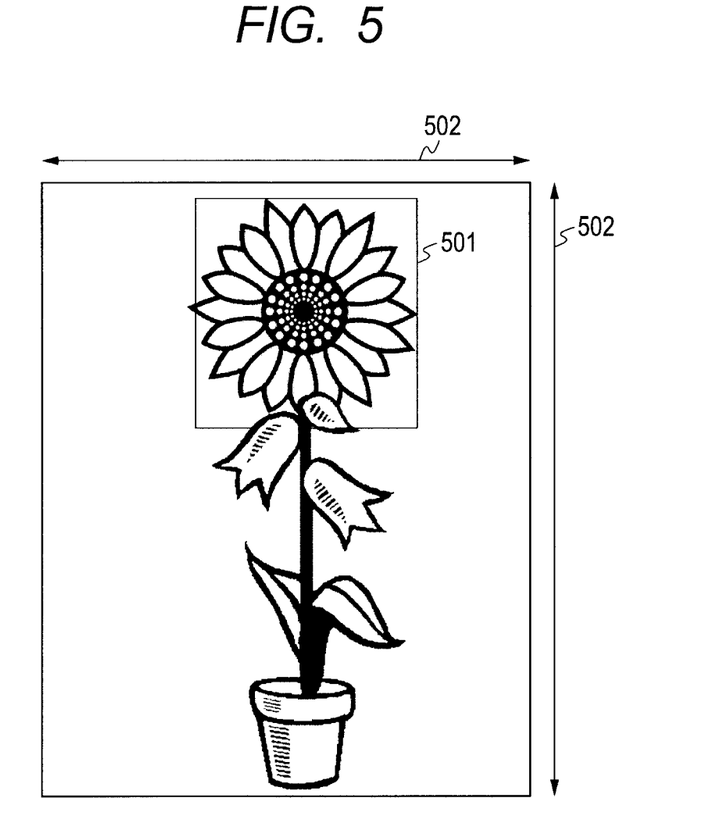
FIG. 5 is a diagram illustrating an example of an input image.

FIG. 5 is the diagram illustrating an example of the input image.

A characteristic obtaining unit 204 obtains a subject characteristic 205 of the subject being the target of learning.

Figure 6:
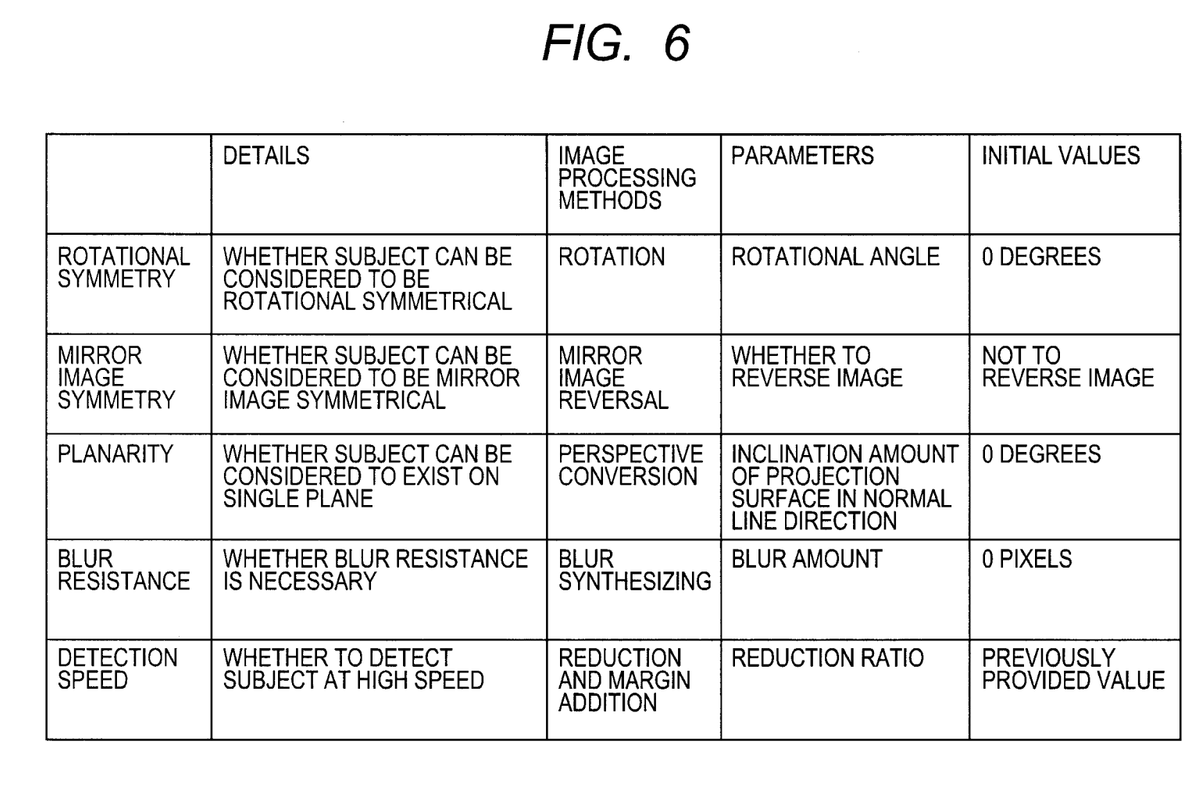
FIG. 6 is a diagram illustrating an example of subject characteristics.

The subject characteristic 205 is the characteristic or the characteristics that the subject has. FIG. 6 illustrates an example of the subject characteristic 205 which is supposed in the present embodiment. Namely, in the present embodiment, by way of example, the subject characteristic will be described by using five kinds of characteristics, i.e., rotational symmetry, mirror image symmetry, planarity, blur resistance, and detection speed (i.e., a detection speed characteristic). More specifically, the rotational symmetry represents a characteristic as to whether or not the subject can be considered to be rotationally symmetrical, the mirror image symmetry represents a characteristic as to whether or not the subject can be considered to be mirror image symmetrical, the planarity represents a characteristic as to whether or not the subject can be considered to exist on a single plane, the blur resistance represents a characteristic as to whether or not blur resistance is necessary, and the detection speed represents a characteristic as to whether or not to detect the subject at high speed. Further, the subject characteristic 205 may include other parameters such as a change amount when changing a parameter of each image process and the like, and may further include other characteristics.

An image processing unit 206 performs, to the subject image group 201, an image process corresponding to the subject characteristic 205, and generates a duplicate subject image group 207. Here, FIG. 6 illustrates the correspondence between the subject characteristics and the image processes, which is supposed in the present embodiment. That is, the image processing unit 206 performs the image processes, such as rotation if the subject has the rotational symmetry, mirror image reversal if the subject has the mirror image symmetry, perspective conversion if the subject has the planarity, blur synthesizing if the subject has the blur resistance, and reduction and margin addition if the detection speed is necessary. Incidentally, the image processing unit 206 may perform only one of the above image processes, or may perform a combination of the arbitrary number of the above image processes.

Figure 7:
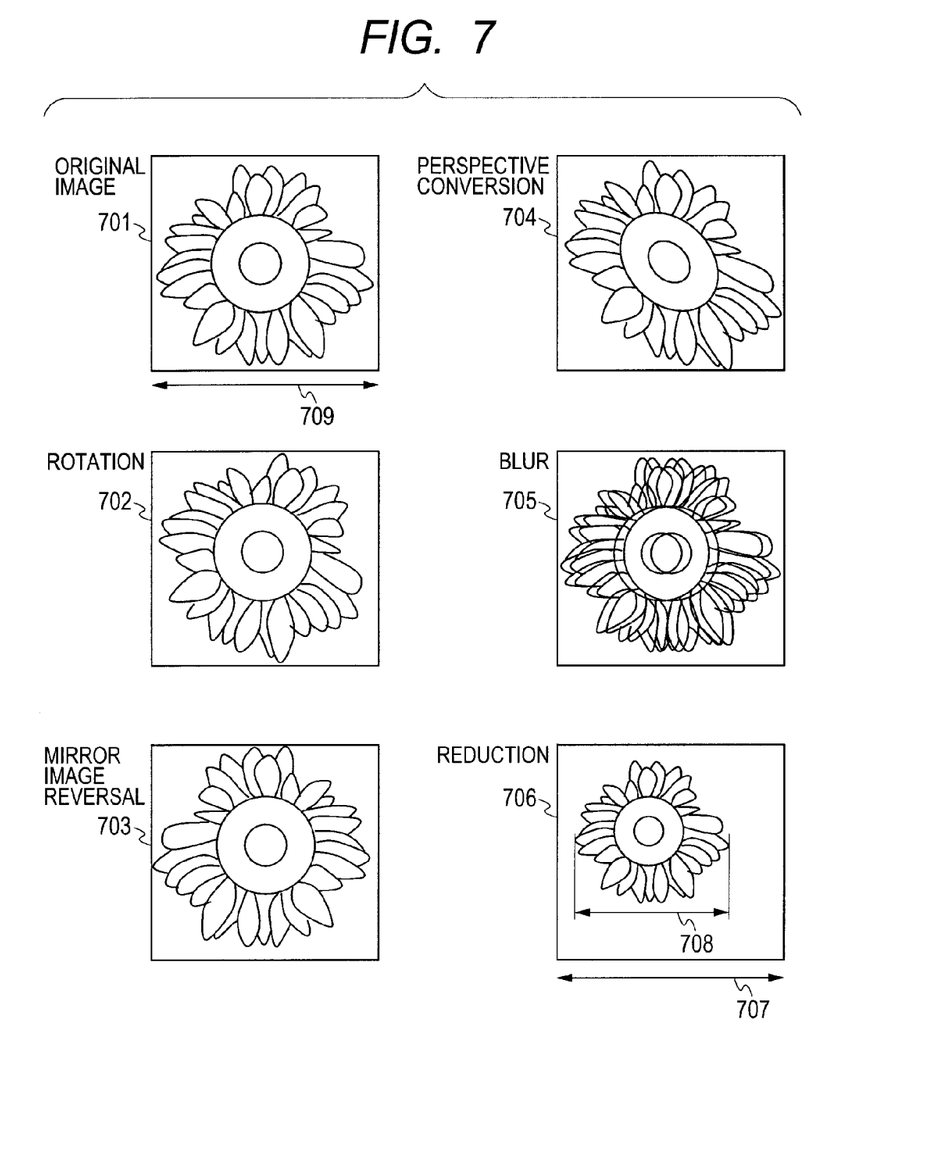
FIG. 7 is a diagram illustrating an example of a subject image and results respectively obtained by performing image processes to the subject image.

The duplicate subject image group 207 is the group of the images which are duplicated from the images of the subject image group 201 by the image processing unit 206, on the basis of the subject characteristic 205. If the subject image is the image illustrated in FIG. 3, i.e., an original image 701 illustrated in FIG. 7, and the subject characteristic of the relevant subject image includes the characteristics as illustrated in FIG. 6, images 702, 703, 704, 705 and 706 illustrated in FIG. 7 are duplicated as duplication images on the basis of the rotation process, the mirror image reversal process, the perspective conversion process, the blur synthesizing process, and the reduction and margin addition process, respectively.

As an image processing parameter 208, various parameters which are used in the respective processes by the image processing unit 206 are stored. Here, FIG. 6 illustrates the correspondence between the image processes and the relevant parameters. That is, the parameters include a rotational angle in regard to the rotation process, a parameter concerning whether or not to reverse an image in regard to the mirror image reversal process, a normal line direction of a projection surface in regard to the perspective conversion process, a blur amount in regard to the blur synthesizing process, and a reduction ratio in regard to reduction and margin addition process.

A learning unit 209 learns the matching dictionary 210 by using the background image group 202 as negative examples and the duplicate subject image group 207 as positive examples.

The matching dictionary 210, which is the matching dictionary that the image processing apparatus creates, includes a size of the image that the dictionary matches, and a reduction ratio of the subject for the size of the image that the dictionary matches. The size of the image that the matching dictionary matches corresponds to a size 301 illustrated in FIG. 3, and the reduction ratio of the subject for the size of the image that the matching dictionary matches corresponds to a ratio of the size 301 and a size 302 both illustrated in FIG. 3. Incidentally, further information may be included in the matching dictionary 210.

The matching unit 211 obtains a matching area by applying the matching dictionary 210 to the input image 203. Namely, in a case where the image illustrated in FIG. 5 is used as the input image 203, a result which is obtained by applying the matching dictionary 210 learned from the subject image group 201 including the image illustrated in FIG. 3 is given as an image 501 illustrated in FIG. 5.

Figure 8:
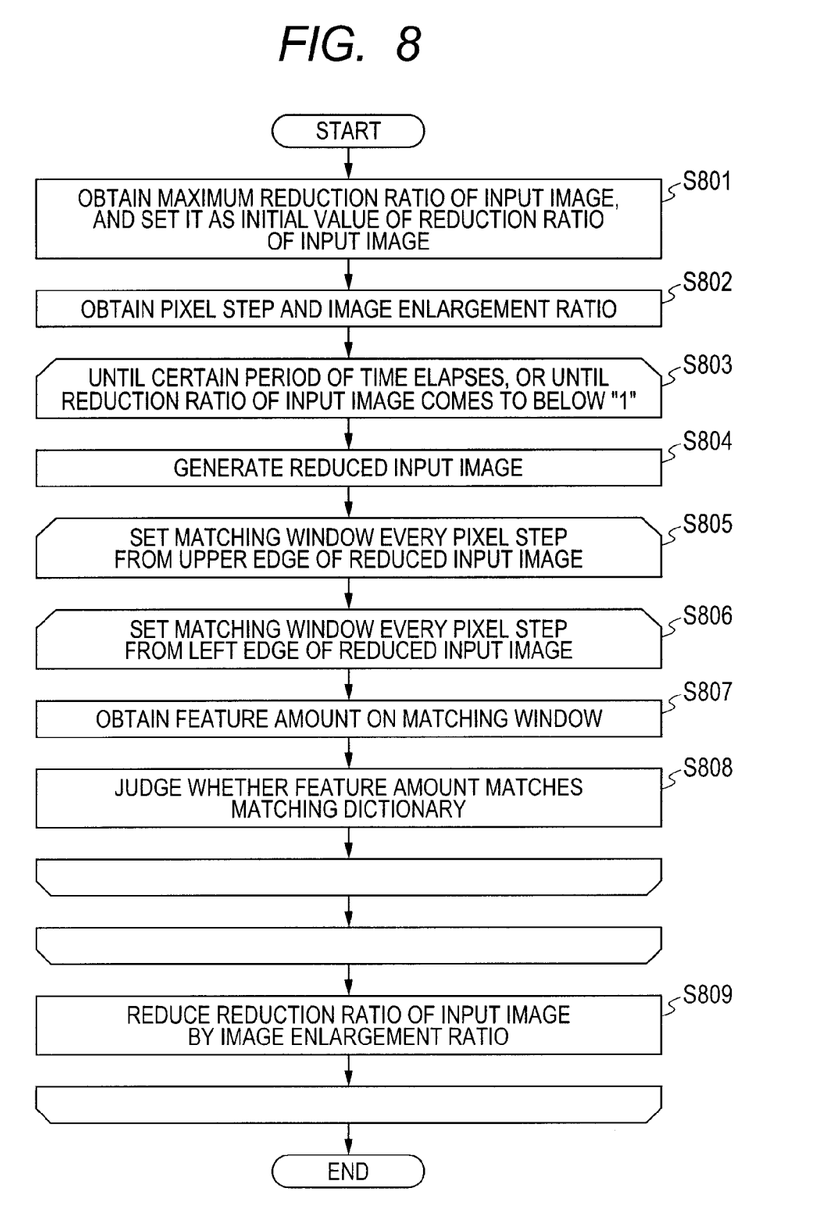
FIG. 8 is a flow chart indicating an example of a process to be performed by a matching unit.

FIG. 8 is a flow chart indicating an example of the process to be performed by the matching unit 211. The matching unit 211 uses the input image 203 and the matching dictionary 210 as the inputs. The process indicted in this flow chart corresponds to a template matching method in which resistance to misregistration is secured by Window Shifting in a size of Pyramid structure as described in, e.g., the non-patent document.

Initially, in a step S801, the matching unit 211 obtains a maximum reduction ratio of the input image, and sets it as an initial value of the reduction ratio of the input image. For example, the matching unit 211 obtains this value by dividing a size 502 of the input image by the size 301 in the matching dictionary 210. Here, if different values are obtained respectively in regard to vertical and horizontal sizes of the image, the matching unit 211 may use either one of these values.

Next, in a step S802, the matching unit 211 obtains a pixel step and an image enlargement ratio respectively from the size of the matching area and a ratio of the subject in the matching area. Here, it is assumed that the size of the matching area and the ratio of the subject in the matching area have been recorded respectively in the matching dictionary 210. The pixel step is obtained by subtracting the size 302 of the subject in the matching area from the size 301 of the matching area. Further, the image magnification ratio is the quotient of the size 302 of the subject in the matching area divided by the size 301 of the matching area. However, since these values are rough standards, the matching unit 211 may change the value of the pixel step according to a required detection performance or the like.

In a step S803, the matching unit 211 repeatedly performs processes in step S804 to S808 until an end condition is satisfied. Here, for example, if it is necessary to perform the processes in real time, the end condition is set as a certain period of time. Namely, these processes are repeatedly performed until the certain period of time elapses. Alternatively, the end condition is set as a period until the reduction ratio of the input image comes to below "1" and thus the input image is not reduced any more. Namely, these processes are repeatedly performed until the reduction ratio of the input image comes to below "1" and thus the input image is not reduced any more. However, an arbitrary end condition may be set. In any case, the process in this step corresponds to creation of Pyramid structure described in, e.g., the non-patent document.

In the step S804, the matching unit 211 reduces the input image based on the reduction ratio of the input image set in the steps S801 and S809, and thus generates the reduced input image.

Next, in the steps S805 and S806, the matching unit 211 repeatedly performs the processes in the steps S807 and S808 as shifting the rectangular area pixel step by pixel step obtained in the step S802 respectively from the upper edge and the left edge of the reduced input image generated in the step S804. Here, it is assumed that the rectangular area is set on the reduced input image, that the upper left point thereof is defined in the step S805 and S806 respectively, and that the seize thereof is equivalent to that of the matching dictionary 210. In any case, the process in this step corresponds to Window Shifting described in, e.g., the non-patent document.

In the step S807, the matching unit 211 obtains, from matching windows respectively set in the steps S805 and S806, its feature amounts. As the feature amount, it is desirable to obtain the feature amounts which are different before and after various image processes performed by the image processing unit 206. In any case, the process in this step corresponds to Haar like feature, Histogram Oriented Gradient or the like described in the non-patent document.

In the step S808, the matching unit 211 judges whether or not the feature amount obtained in the step S807 matches the matching dictionary 210. The process in this step corresponds to Adaboost, Support Vector Machine or the like described in the non-patent document.

In the step S809, the matching unit 211 integrates the image enlargement ratio to the reduction ratio of the input image to reduce the reduction ratio of the input image. That is, the matching unit 211 applies the processes in the steps S805 to S808 to a larger image.

While the loop in the step S803 is repeated, if once judged in the step S808 that the feature amount matches the matching dictionary 210, then the matching unit 211 judges that the matching dictionary 210 matches the input image 203. On the other hand, if not once judged that the feature amount matches the matching dictionary 210, then the matching unit 211 judges that the matching dictionary 210 does not match the input image 203.

After it was judged whether or not the matching dictionary matches the input image, the matching unit 211 outputs the coordinates of the input image if judged that the matching dictionary matches the relevant input image.

Figure 9:
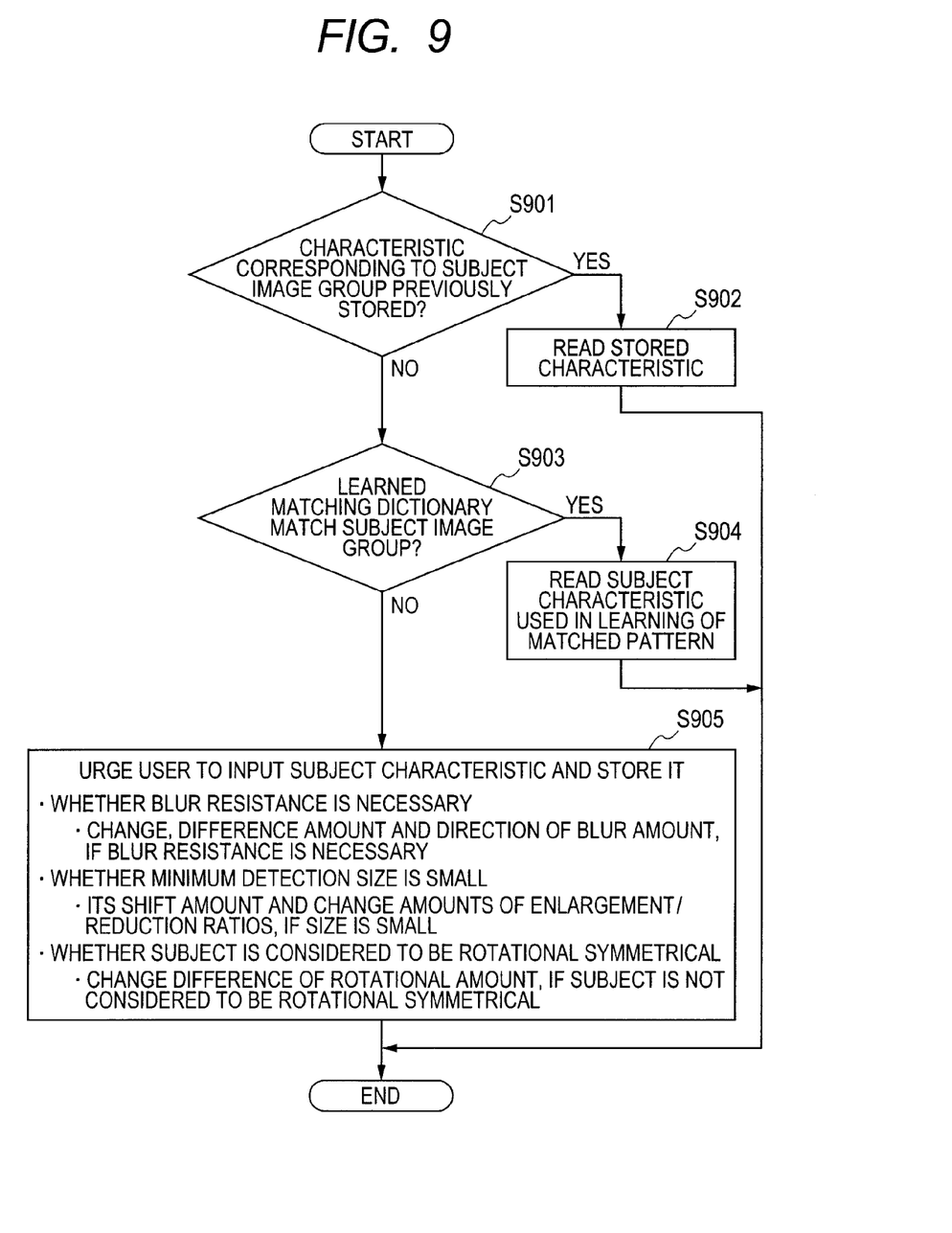
FIG. 9 is a flow chart indicating an example of a process to be performed by a characteristic obtaining unit.

FIG. 9 is a flow chart indicating an example of a process to be performed by the characteristic obtaining unit 204.

The characteristic obtaining unit 204 uses the subject image group 201 and the matching dictionary 210 as inputs, and further uses the subject characteristic 205 as an output.

Initially, in a step S901, the characteristic obtaining unit 204 judges whether or not a subject characteristic corresponding to the subject image group 201 has been stored previously. Here, it should be noted that the subject characteristic is stored in a later-described step S905. In any case, the characteristic obtaining unit 204 advances the process to a step S902 if the subject characteristic has been stored previously. On the other hand, the characteristic obtaining unit 204 advances the process to a step S903 if the subject characteristic is not yet stored.

In the step S902, the characteristic obtaining unit 204 reads the already stored subject characteristic to set the read characteristic as the subject characteristic 205 being the output of the characteristic obtaining unit 204. Then, the process of the characteristic obtaining unit 204 ends.

In the step S903, the characteristic obtaining unit 204 calls the matching unit 211 by using an arbitrary image in the subject image group 201 and the matching dictionary 210 learned. The characteristic obtaining unit 204 advances the process to a step S904 if the matching dictionary matches the subject image group. On the other hand, the characteristic obtaining unit 204 advances the process to the step S905 if the matching dictionary does not match the subject image group.

In the step S904, the characteristic obtaining unit 204 obtains the subject characteristics used in the learning of the matching dictionary 210, and sets them as the subject characteristic 205 being the output of the characteristic obtaining unit 204. After then, the process of the characteristic obtaining unit 204 ends.

In the step S905, the characteristic obtaining unit 204 urges the user to input the subject characteristic 205, and stores a result thereof. After then, the process of the characteristic obtaining unit 204 ends. Here, how to input the subject characteristic 205 is arbitrarily determined.

Figure 10:
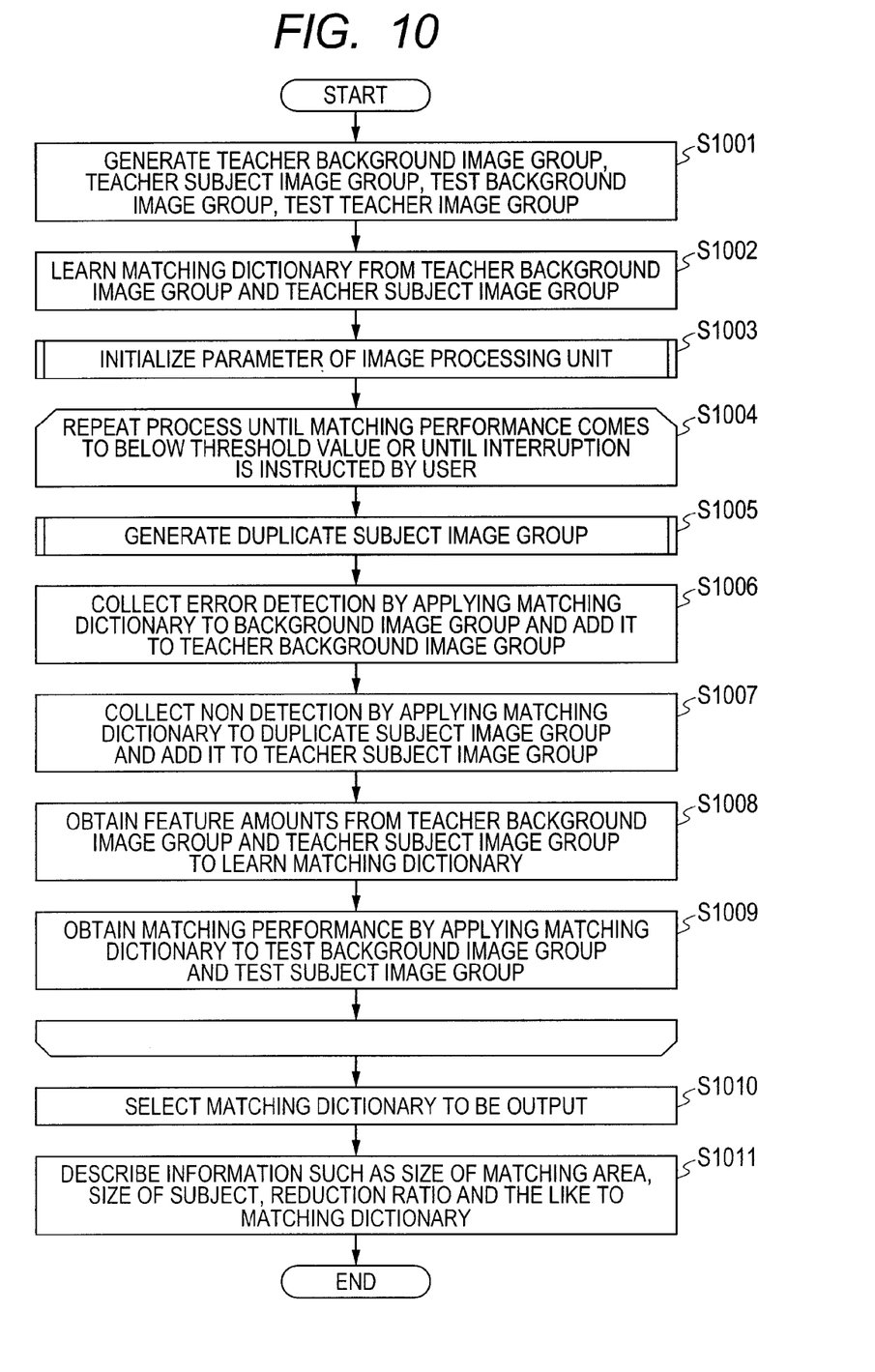
FIG. 10 is a flow chart indicating an example of a process to be performed by a learning unit.

FIG. 10 is a flow chart indicating an example of a process to be performed by the learning unit 209.

The learning unit 209 uses the subject image group 201, the background image group 202 and the subject characteristic 205 as inputs. Further, the learning unit 209 uses the matching dictionary 210 as an output.

In a step S1001, the learning unit 209 generates a teacher background image group, a teacher subject image group, a test background image group, and a test teacher image group. More specifically, the learning unit 209 sets a part of the subject image group 201 as the teacher subject image group and the remains thereof as a test subject image group, and further sets a part of the background image group 202 as the teacher background image group and the remains thereof as the test teacher image group. Further, the learning unit 209 uses the teacher background image group and the teacher subject image group in the learning of the matching dictionary 210. Furthermore, the learning unit 209 uses the test background image group and the test teacher image group in measurement (or test) of the performance of the matching dictionary 210 learned.

By processes in steps S1002, S1003, S1004, S1005, S1006, S1007 and S1008, the learning unit 209 learns the matching dictionary 210.

First, in the step S1002, the learning unit 209 obtains the feature amount from the teacher background image group and the teacher subject image group respectively set in the step S1001, and learns the matching dictionary 210. In the process of this step, a learning method of general subject detector/ subject recognizer, such as a Viola's method described in the non-patent document, is applicable. However, the feature amount and the method used in this step respectively have to be the feature amount managed by the matching unit 211 in the step S807 and the method corresponding to the matching method used in the step S808.

Next, in the step S1003, the learning unit 209 initializes the image processing parameter 208 used by the image processing unit 206. The details of this step will be described later.

Next, in the step S1004, the learning unit 209 repeats the processes from the step S1005 to the step S1009 until the matching performance obtained in a step S1009 comes to below a threshold value or until interruption is instructed by the user. Incidentally, another arbitrary condition may be set as the condition for ending the loop.

Next, in the step S1005, the learning unit 209 obtains the duplicate subject image group 207 based on the subject characteristic 205 by using the image processing unit 206.

Next, in the step S1006, the learning unit 209 calls the matching unit 211, and applies the matching dictionary 210 learned in the step S1002 or S1008 to the background image group 202. After then, the learning unit 209 adds the matched area to the teacher background image group. Since all the partial areas of the background image group 202 do not include the subject image, the learning unit 209 may add all the matched areas to the teacher background image group.

Next, in the step S1007, the learning unit 209 calls the matching unit 211, and applies the matching dictionary 210 learned in the step S1002 or S1008 to the respective images in the duplicate subject image group 207 obtained in the step S1005. After then, the learning unit 209 adds the not-matched areas to the teacher subject image group. Since all the images of the subject image candidate group are generated from the subject image by the image processes, the learning unit 209 should add all the not-matched areas to the teacher subject image group.

Next, in the step S1008, the learning unit 209 learns the matching dictionary 210 from the teacher background image group obtained in the step S1006 and the teacher subject image group obtained in the step S1007. Here, it should be noted that the process in the learning is the same as that in the step S1002.

Next, in the step S1009, the learning unit 209 calls the matching unit 211 in regard to the respective images of the test background image group and the test subject image group, and obtains the matching performance of the matching dictionary 210 learned in the step S1008. In the present embodiment, a hit ratio and a correct rejection ratio are assumed as the matching performance. However, the learning unit 209 may measure another performance to set it as the condition of ending the loop in the step S1004.

In a step S1010, if it is judged to end the loop in the step S1004, the learning unit 209 selects the matching dictionary 210 to be output. It does not matter at which time in the loop the matching dictionary 210 was learned. In other words, it is possible to select any one of the matching dictionary 210 having the maximum performance, the matching dictionary 210 satisfying the end condition, and the latest matching dictionary 210 not satisfying the end condition.

In a step S1011, the learning unit 209 records the matching area size, and the subject size in the matching area to the matching dictionary 210. The duplicate subject image 706 illustrated in FIG. 7 has the matching area size 707 and the subject size 708 in the matching area. The subject size 708 is obtained by integrating the reduction ratio in the image processing parameter to the subject size 708. These sizes vary particularly in a case where the reduction process is performed in the image processing unit 206.

The matching dictionary 210 obtained in the step S1011 is used as the output of the learning unit 209.

Figure 11:
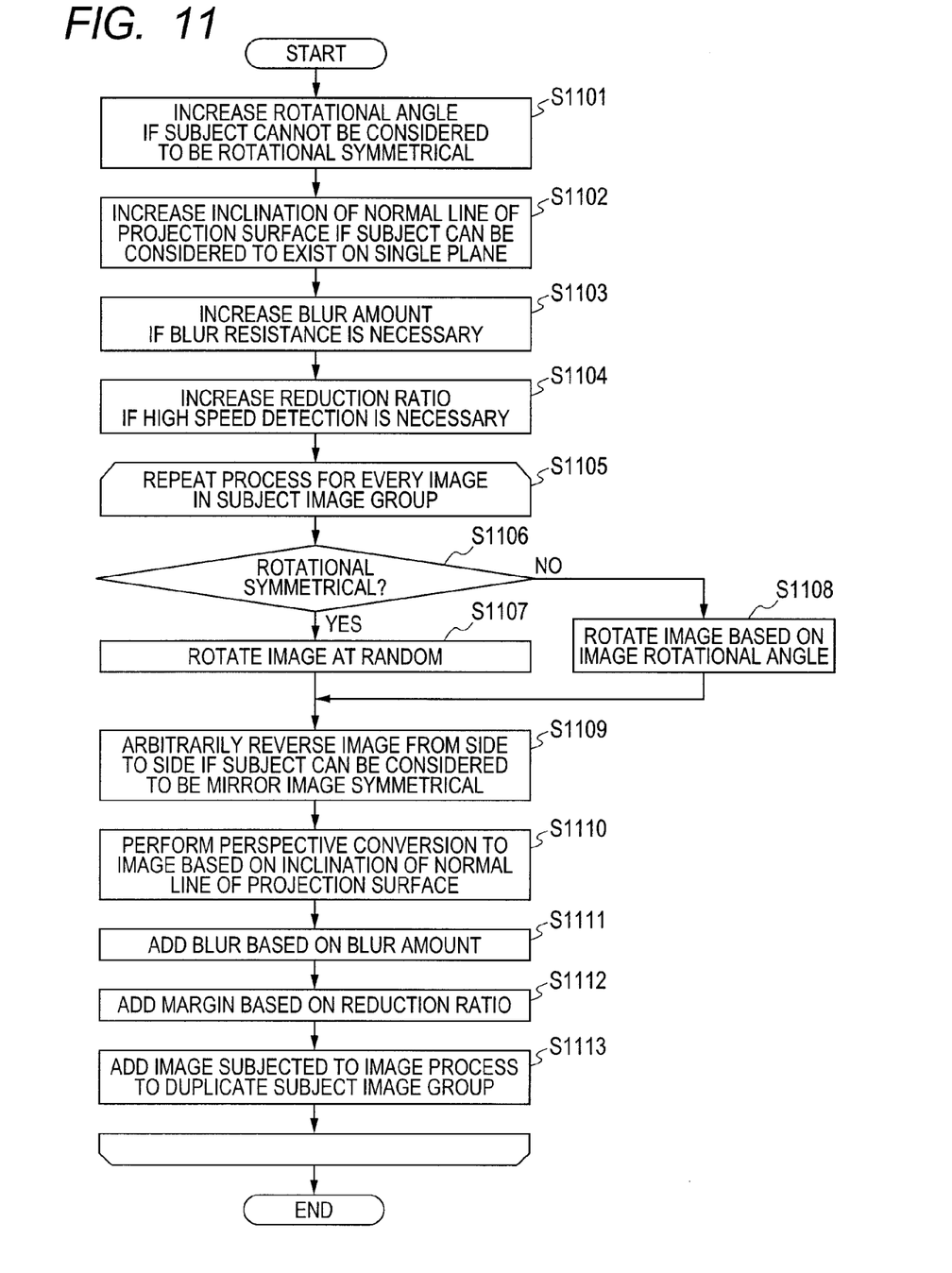
FIG. 11 is a flow chart indicating an example of an image process.

FIG. 11 is a flow chart indicating an example of the image process to be performed by the image processing unit 206.

The image processing unit 206 uses the subject image group 201 and the subject characteristic 205 as inputs. Further, the image processing unit 206 uses the duplicate subject image group 207 as an output. Furthermore, the image processing unit 206 uses the image processing parameter 208. Here, FIG. 6 illustrates the kinds of characteristics, the details of the characteristics, the corresponding image processing methods, their parameters and their initial values in the subject characteristic 205.

It is necessary to initialize the image processing parameter 208 before the image processing unit 206 is called. Such initializing of the parameters is called from the step S1003 to be performed by the learning unit 209. More specifically, to initialize the parameters, the rotational angle in the rotation process is set to 0 degrees, it is set not to reverse the mirror image, the inclination amount of the projection surface in the normal line direction is set to 0 degrees, the blur amount (the blur synthesizing amount) is set to 0 pixels, and the reduction ratio is set to a previously provided value.

Further, the image processing unit 206 changes the contents of the image processing parameter 208 in steps S1101, S1102, S1103 and S1104. Here, a change amount of each content may be previously set, or may be previously input as a part of the subject characteristics. Further, such changes may be based on increase and decrease of differences, multiplier based on ratios, results of other calculations, or the like.

Initially, in the step S1101, the image processing unit 206 judges whether or not the subject can be considered to be rotationally symmetrical in the subject characteristic 205. If judged that the subject cannot be considered to be rotationally symmetrical, the image processing unit 206 increases the rotational angle.

Next, in the step S1102, the image processing unit 206 judges whether or not the subject can be considered to exist on the single plane in the subject characteristic 205. If judged that the subject can be considered to exist on the single plane, the image processing unit 206 increases the inclination amount of the projection surface in the normal line direction.

Next, in the step S1103, the image processing unit 206 judges whether or not the blur resistance is necessary for the subject in the subject characteristic 205. If judged that the blur resistance is necessary, the image processing unit 206 increases the blur amount.

Next, in the step S1104, the image processing unit 206 judges whether or not it is necessary to detect the subject at high speed in the subject characteristic 205. If judged that it is necessary to detect the subject at high speed, the image processing unit 206 increases the reduction ratio if the reduction ratio is necessary.

Next, in a step S1105, the image processing unit 206 repeatedly performs processes in steps S1106, S1107, S1108, S1109, S1110, S1111, S1112 and S1113 to all the images included in the subject image group 201.

First, in the step S1106, the image processing unit 206 judges whether or not the subject is rotationally symmetrical in the subject characteristic 205. If judged that the subject is rotationally symmetrical, the processing unit 206 advances the process to the step S1107. On the other hand, if judged that the subject is not rotationally symmetrical, the processing unit 206 advances the process to the step S1108.

In the step S1107, the image processing unit 206 rotates the subject image at random to set the relevant image as the duplicate subject image. Here, the plural images of which the rotational angles are respectively different may be set as the duplicate subject images. After then, the image processing unit 206 advances the process to the step S1109.

In the step S1108, the image processing unit 206 rotates the subject image by the rotational angle to set the relevant image as the duplicate subject image. After then, the image processing unit 206 advances the process to the step S1109. The image 702 is an example which is obtained by rotating the subject image 701.

In the step S1109, the image processing unit 206 judges whether or not the subject is mirror image symmetrical in the subject characteristic 205. If judged that the subject can be considered to be mirror image symmetrical, the image processing unit 206 arbitrarily reverses the duplicate subject image from side to side (that is, performs the mirror image reversal). Here, to arbitrarily reverse the image is, for example, to generate a random number and then reverse the image at a certain ratio or more based on the generated random number. The image 703 is an example which is obtained by reversing the subject image 701 from side to side.

In the step S1110, the image processing unit 206 performs the perspective conversion process to the duplicate subject image based on the inclination amount of the projection surface in the normal line direction. Here, the image processing unit 206 may generate the plural duplicate subject images by creating the plural perspective conversion processes in which the angle between the plane surface of the subject image and the projection surface is equal to the inclination amount of the projection surface in the normal line direction. The image 704 is an example which is obtained by performing the perspective conversion process to the subject image 701.

In the step S1111, the image processing unit 206 adds blur to the duplicate subject image based on the blur amount. At this time, the image processing unit 206 may generate the plural duplicate subject images by synthesizing blur in arbitrary directions. The image 705 is an example which is obtained by adding blur to the subject image 701.

In the step S1112, the image processing unit 206 reduces the duplicate subject image based on the reduction ratio, and adds a margin to the periphery of the reduced image. For example, the image processing unit 206 makes a size 707 of the duplicate subject image equal to a subject size 709 of the subject image 701, and generates the image in which the subject area of a reduced size 708 is superposed at an arbitrary position in the rectangle of the duplicate subject image. At this time, the image processing unit 206 may generate the plural duplicate subject images by arbitrarily changing the position where the subject area is superposed. The image 706 is an example which is obtained by adding the margin to the subject image 701 in FIG. 7.

In the step S1113, the image processing unit 206 adds the duplicate subject images respectively generated in the steps S1106 to S1112 to the duplicate subject image group 207.

As described above, according to the present embodiment, it is possible to generate the numerous duplicate subject image groups 207 with respect to the subject image group 201 on the basis of the subject characteristic 205. Thus, it is resultingly possible to improve the performance of the matching dictionary 210 learned from the same subject image group, or it is possible to reduce the number of the subject images necessary for the learning of the matching dictionary 210 having the same performance.

Further, it is possible to rotate at the arbitrary angle the subject image group 201 which can be considered to be rotationally symmetrical or to exist on the single plane based on the subject characteristic 205. Thus, it is possible to generate the numerous duplicate subject image groups 207 in addition to only the mirror image reversal.

Furthermore, according to the present embodiment, since a sample cannot be generated by the transparent conversion process for the subject image group 201 which is not considered to exist on the single plane based on the subject characteristic 205, it is possible to prevent deterioration of the performance of the matching dictionary 210 learned from the subject image group 201.

Furthermore, according to the present embodiment, with respect to the subject image group 201 that the blur resistance is necessary based on the subject characteristic 205, the learning can be performed from the duplicate subject image group 207 including the blur image, it is possible to expect that matching accuracy is improved in the case where the input image 203 is blurred.

Furthermore, according to the present embodiment, with respect to the subject image group 201 that it is necessary to detect the subject at high speed based on the subject characteristic 205, the image processing unit 206 generates the duplicate subject image group 207 in which the subject size 708 is made small as compared with the size 707 of the matching dictionary 210. Thus, the pixel step and the image enlargement ratio obtained by the matching unit 211 in the step S802 are large. As a result, the number of times of the loop process in the steps S803 to S809 decreases, whereby it is possible to expect a higher-speed process by the matching unit 211. In addition, according to the present embodiment, in such a case of object detection where the process by the matching unit 211 may end per unit of time, it is possible to perform matching to a large image within the range satisfying the end condition in the step S803. Therefore, it is resultingly possible to try to perform matching to a smaller area included in the image.

Furthermore, according to the present embodiment, the learning unit 209 can generate and learn the duplicate subject image group 207 within the range that the matching performance obtained in the step S1009 satisfies the condition defined in the step S1004. That is, it is possible to create the strong and sturdy matching dictionary 210 within the range satisfying the matching performance for the subject characteristic 205.

As described above, according to the embodiment of the present invention, it is possible to reduce the number of subject images necessary for the learning.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or an apparatus (or device such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-239553, filed Oct. 16, 2009, which is hereby incorporated by reference herein in its entirety.

What is claimed is:

1. An image processing apparatus comprising:
   a characteristic obtaining unit configured to obtain a characteristic of a subject which is an original learning sample in an input subject image;
   a selection unit configured to select a type of image process which is associated with the obtained characteristic of the subject, where different types of image processes are associated with respective characteristics in advance;
   an image processing unit configured to generate a group of the subject images as additional learning samples by performing the selected type of image process on the subject image with different parameters; and
   a learning unit configured to learn a matching dictionary by using the original learning sample and the additional learning samples.

2. An image processing apparatus according to claim 1, wherein
   in a case where the subject can be considered to be rotationally symmetrical according to the characteristic of the subject obtained by the characteristic obtaining unit, the image processing unit performs the image process of rotating the subject image at random, and
   in a case where the subject cannot be considered to be rotationally symmetrical according to the characteristic of the subject obtained by the characteristic obtaining unit, the image processing unit performs the image process of rotating the subject image based on a rotational angle set as a parameter.

3. An image processing apparatus according to claim 1, wherein, in a case where the subject can be considered to be mirror image symmetrical according to the characteristic of the subject obtained by the characteristic obtaining unit, the image processing unit performs the image process of performing mirror image reversal to the subject image according to information, set as a parameter, indicating whether or not to reverse the image.

4. An image processing apparatus according to claim 1, wherein, in a case where the subject can be considered to exist on a single plane according to the characteristic of the subject obtained by the characteristic obtaining unit, the image processing unit performs the image process of performing perspective conversion to the subject image on the basis of an inclination amount of a projection surface in a normal line direction set as a parameter.

5. An image processing apparatus according to claim 1, wherein, in a case where blur resistance is considered to be necessary for the subject according to the characteristic of the subject obtained by the characteristic obtaining unit, the image processing unit performs the image process of performing blur synthesizing to the subject image on the basis of a blur amount set as a parameter.

6. An image processing apparatus according to claim 1, wherein, in a case where it is considered to be necessary to detect the subject at high speed according to the characteristic of the subject obtained by the characteristic obtaining unit, the image processing unit performs the image process of reducing the subject image on the basis of a reduction ratio set as a parameter.

7. An image processing apparatus according to claim 2, wherein the learning unit tests matching performance of the matching dictionary by using the group of the subject images generated by the image processing unit, and changes setting of the parameter to be used by the image processing unit so that the matching performance may satisfy a given condition.

8. An image processing method to be performed by an image processing apparatus, the image processing method comprising:
   obtaining a characteristic of a subject which is an original learning sample in an input subject image;
   selecting a type of image process which is associated with the obtained characteristic of the subject, where different types of image processes are associated with respective characteristics in advance;
   generating a group of subject images as additional learning samples by performing the selected type of image process on the subject image with different parameters; and
   learning a matching dictionary by using the original learning sample and the additional learning samples.

9. A non-transitory tangible computer-readable medium which stores a program for causing a computer to function as:
   a characteristic obtaining unit configured to obtain a characteristic of a subject which is an original learning sample in an input subject image;
   a selection unit configured to select a type of image process which is associated with the obtained characteristic of the subject, where different types of image processes are associated with respective characteristics in advance;
   an image processing unit configured to generate a group of the subject images as additional learning samples by performing the selected type of image process on the subject image with different parameters; and
   a learning unit configured to learn a matching dictionary by using the original learning sample and the additional learning samples.

* * * * *